March 11, 1958 E. C. HORTON 2,825,919
WINDSHIELD CLEANER

Filed April 8, 1954 4 Sheets-Sheet 1

INVENTOR.
Erwin C. Horton
BY
Beau, Brooks, Buckley & Beau
Attys.

March 11, 1958 E. C. HORTON 2,825,919
WINDSHIELD CLEANER
Filed April 8, 1954 4 Sheets-Sheet 2
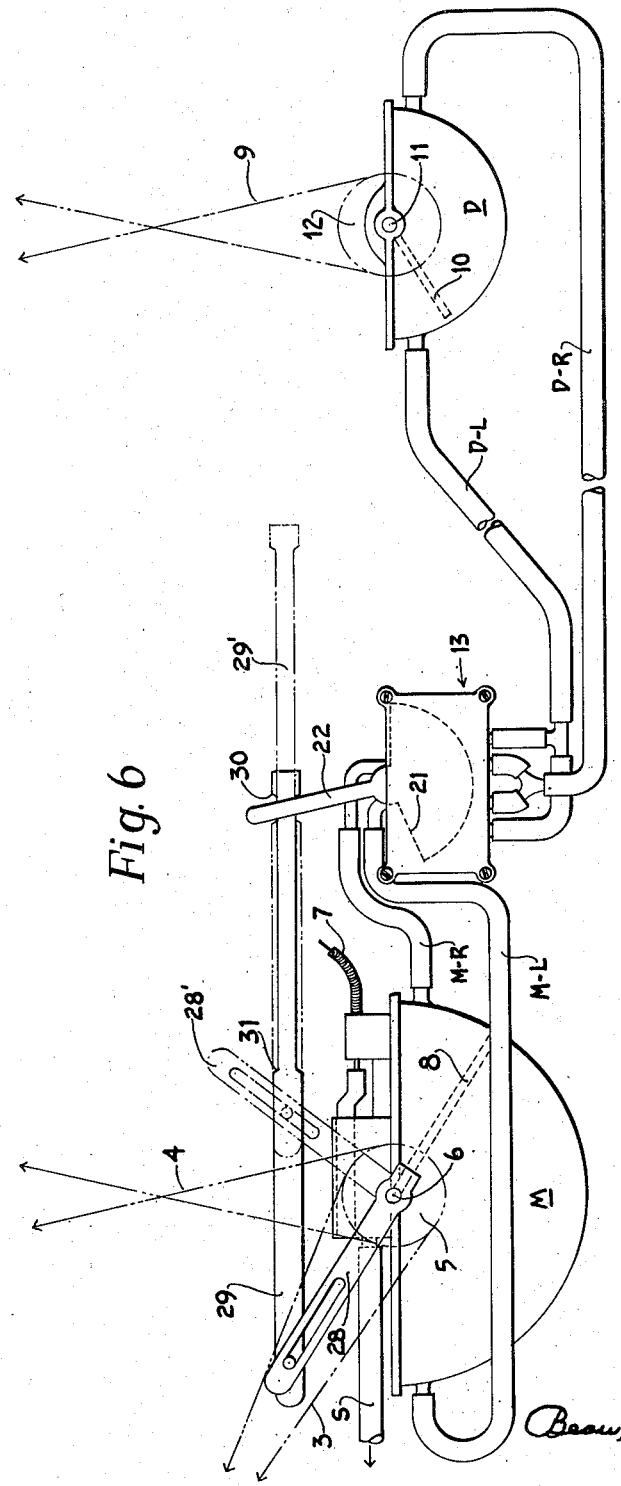
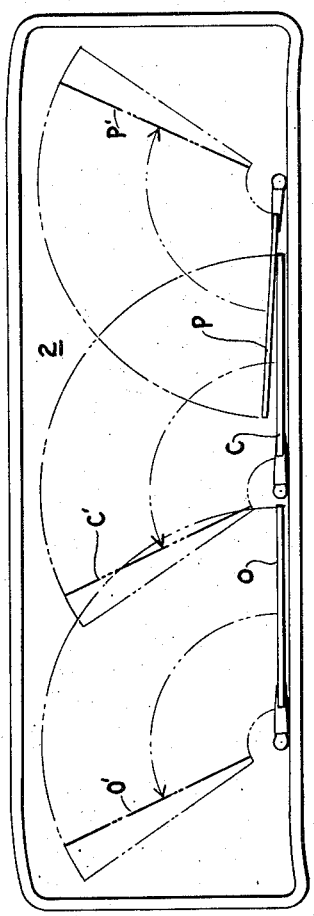
INVENTOR.
Erwin C. Horton
BY
Beau, Brooks, Buckley & Beau
Attys.

March 11, 1958 E. C. HORTON 2,825,919
WINDSHIELD CLEANER
Filed April 8, 1954 4 Sheets-Sheet 3

INVENTOR.
Erwin C. Horton
BY
Beau, Brooks Buckley & Beau
Attys.

March 11, 1958  E. C. HORTON  2,825,919
WINDSHIELD CLEANER
Filed April 8, 1954  4 Sheets-Sheet 4

INVENTOR.
Erwin C. Horton
BY
Beau, Brooks, Buckley & Beau
Attys.

United States Patent Office 2,825,919
Patented Mar. 11, 1958

2,825,919

WINDSHIELD CLEANER

Erwin C. Horton, Hamburg, N. Y., assignor to Trico Products Corporation, Buffalo, N. Y.

Application April 8, 1954, Serial No. 421,737

17 Claims. (Cl. 15—253)

This invention relates to a windshield cleaner for automotive vehicles, and more particularly to a cleaner adapted to eliminate the blind spot existent on the central portion of windshields during heavy weather.

Heretofore, windshield cleaners have comprised two blades, one located substantially in front of the operator of the vehicle and the other substantially in front of the passenger, with both blades oscillating about pivots located proximate to the lower molding of the windshield. In some systems the blades were run in parallelism while in others they ran in opposition or "clapped hands" relationship. However, regardless of the relative motion between the blades, the central portion of the windshield was beyond the wiping area of either blade, and thus remained completely obliterated in heavy weather, obstructing the vision of the operator.

With the increased employment of motor vehicles and the traffic congestion resulting therefrom, the need for greater visibility is of paramount importance and has resulted in the design of vehicles with ever increasing glass area. But, in heavy weather when the need for maximum visibility is most important, the increased glass area is of no significance whatsoever if such area remains obliterated. There is therefore a distinct need for a cleaning system which is adapted to clear of precipitation substantially the entire windshield. Accordingly, two alternatives have been proposed, increasing the longitudinal dimension of the blades so as to increase the area wiped, or increasing the number of blades. The former suggestion must be rejected as impractical since blades of substantially greater length than those presently employed would strike the upper molding of the shield and stall as they oscillate thereacross. The second proposal has heretofore had several shortcomings. Since it is desired to have the individual wiped areas overlap, the blades will constantly interfere with one another unless run in substantial parallelism. But, such relationship requires at least one of the blades to be parked in a substantially vertical position if the sides as well as the central portion of the shield are to be cleaned. This would result in the obstruction of vision in clear weather when the cleaner is not in use. Conversely, if the blades are parked in opposed overlapping relationship so as not to obstruct vision in clear weather, the danger of interference and binding, as mentioned above, arises.

Accordingly, it is the primary object of the present invention to provide a multiple blade windshield cleaning system which is adapted to clean the heretofore obliterated central portion of the shield as well as those areas previously cleaned, without having the blades interfere with one another in operation and yet being capable of parking all the blades proximate to the lower molding of the shield.

For a greater appreciation of this and other objects of the invention, reference is made to the following specifications and accompanying drawings wherein.

Figs. 6 through 10 in conjunction with Figs. 6A through 10A illustrate the cycle of operation of the instant invention.

Figure 1:
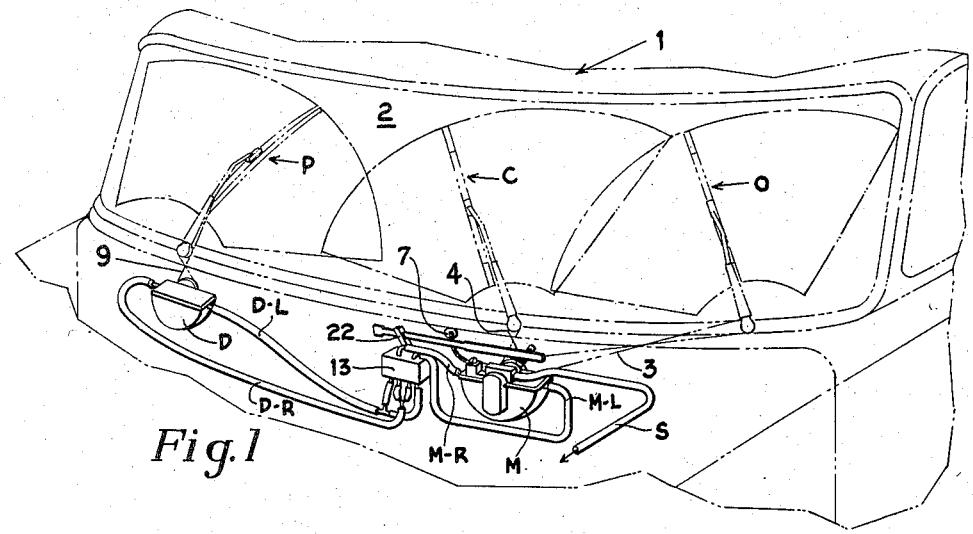
Fig. 1 is a fragmentary perspective view of an automotive vehicle equipped with a windshield cleaning system constructed in accordance with the instant invention.

Referring now more particularly to the drawings, the numeral 1 generally designates an automotive vehicle having a windshield 2 and wiper blades O, C and P, located respectively in front of the operator, at substantially the center of the shield and in front of the passenger. As is best seen in Figs. 1 and 6, blades O and C are coupled by cables 3 and 4 respectively to an oscillatory drum 5 mounted on the driveshaft 6 of master motor M. The motor may be of the conventional pneumatic type such as that disclosed in Patent No. 2,298,734 issued to Louis Buchmann on October 13, 1942, or one similar thereto, and is connected by hose S to a source of suction such as the intake manifold of the vehicle's engine or to a pneumatic pump. A series of valves embodied in the motor and remotely actuated from the passenger compartment by means of bowden cable 7 controls the flow of air in the motor so as to maintain a pressure differential across vane 8 mounted on drive shaft 6 as is more fully disclosed in the above identified patent. The vane always moves toward the low pressure side of the motor, and at the proper time the valving between the motor and hose S is reversed so as to cause the vane and its associated drive shaft to oscillate, transmitting the motion to blades O and C via drum 5 and cables 3 and 4. It may be seen that this arrangement insures the movement of blades O and C in parallelism at all times.

A series of hoses connect master motor M to dummy motor D which drives blade P through cable 9. As its name implies, the dummy motor is merely a pressure chamber having a vane 10 therein connected to a drive shaft 11 externally mounting drum 12 about which cable 9 is wrapped. The dummy motor is completely devoid of valving, depending upon the master motor for the reversal of the pressure differential across vane 10. Interposed between the two motors is a reversing valve generally designated as 13 whose purpose shall be set forth more fully below. As is best seen in Fig. 6, the right and left sides of master motor M are respectively connected to valve 13 by hoses M—R and M—L while hoses D—R and D—L connect the right and left sides respectively of the dummy motor to the valve.

Figure 2:
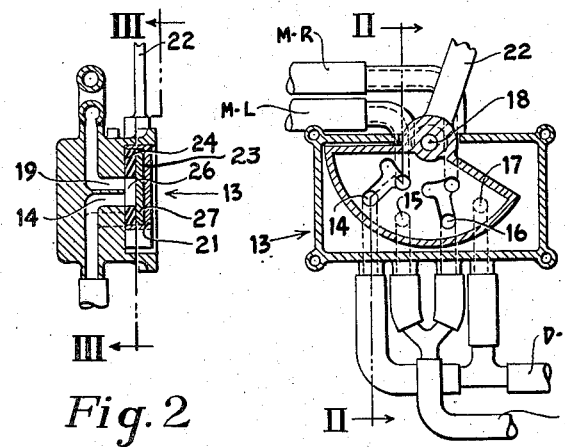
Fig. 2 is a sectional view of the reversing valve taken on line II—II of Fig. 3.
Figure 3:
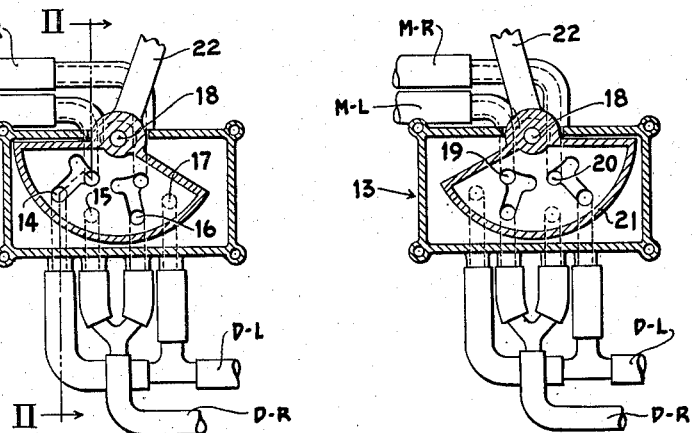
Fig. 3 is a view of the reversing valve in running position taken on line III—III of Fig. 2.
Figure 4:
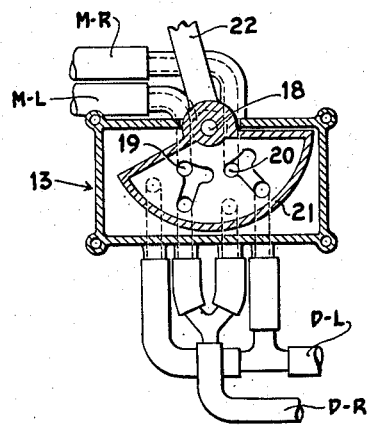
Fig. 4 is a view similar to Fig. 3, but showing the reversing valve in its parking position.
Figure 5:
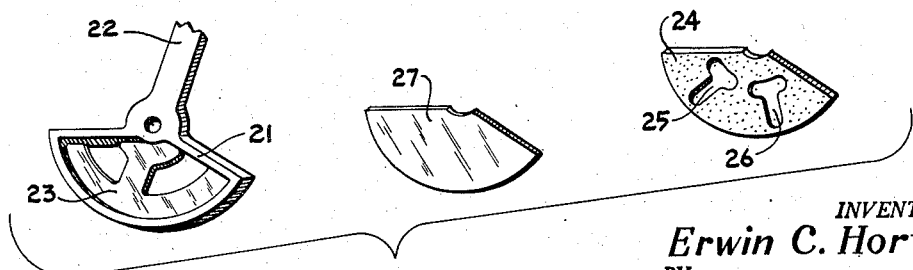
Fig. 5 is an exploded view of the active member of the reversing valve.

Referring now more particularly to Figs. 2 through 5, the reversing valve comprises a substantially rectangular case having four lower ports 14 through 17 all located an equal radial distance from pivot 18, and two upper ports 19 and 20, both an equal radial distance from pivot 18 and closer thereto than ports 14 through 17. Ports 14 and 17 are connected to the left side of the dummy motor by hose D—L while ports 15 and 16 are connected to they right side of motor D by hose D—R. Similarly, port 19 is connected to the left side of master motor M by hose M—L while port 20 is connected to the right side by hose M—R. The active member of the valve comprises a sector 21 having an upstanding arm 22 and mounted for rotation about pivot 18. Leaf spring 23 is contained within a depression or pocket in sector 21. Element 24 which may be of rubber or some similar material has two radial T-slots 25 and 26 and is located within the pocket of the sector with backing plate 27 interposed between the element and leaf spring. The active member is assembled with the case so that element 24 is contiguous with the ported surface while the backing plate and leaf spring insure an airtight engagement as best seen in Fig. 2. When the reversing valve is in its running position, illustrated in Fig. 3, the left side of the master motor is connected to the left side of the dummy motor through the reversing valve, and the right sides of the two motors are similarly connected. Conversely, when the valve is in its parking position as illustrated in Fig. 4, the left side of the master motor is connected to the right side of the dummy motor and the right side of the master motor is connected to the left side of the dummy motor.

Prior to the commencement of operation, blades O and C are parked in parallelism along the lower molding of the shield while blade P is parked in phase opposition to and overlapping blade C as best seen in Fig. 6A. The reversing valve is in its parking position interconnecting the right and left sides respectively of motors M and D. When the system is activated, vane 8, drive shaft 6 and crank arm 28 which is rigidly mounted on shaft 6 rotate in a clockwise direction so as to drive blades O and C counterclockwise away from the molding. Due to the position of the reversing valve, vane 10 and its associated drive shaft 11 rotate in a counterclockwise direction so as to drive blade P clockwise as best seen in Fig. 6A. As blades C and P are moving in substantially the same direction no binding takes place in spite of their overlapping relationship. In other words, blades O and C commence operation in parallelism while blade P moves in phase opposition in the sense that it rotates in a clockwise direction while blades O and C move counterclockwise.

Connecting rod 29 slides in a slot provided therefor in arm 22 with the spaced shoulders 30 and 31 forming a lost motion connection between the rod and arm. The opposite end of the rod is attached to crank arm 28 via a pin and slot connection so that oscillation of the latter results in reciprocation of the rod. If desired, horizontal guide ways may be provided to maintain the rod in its proper path.

Figure 7:
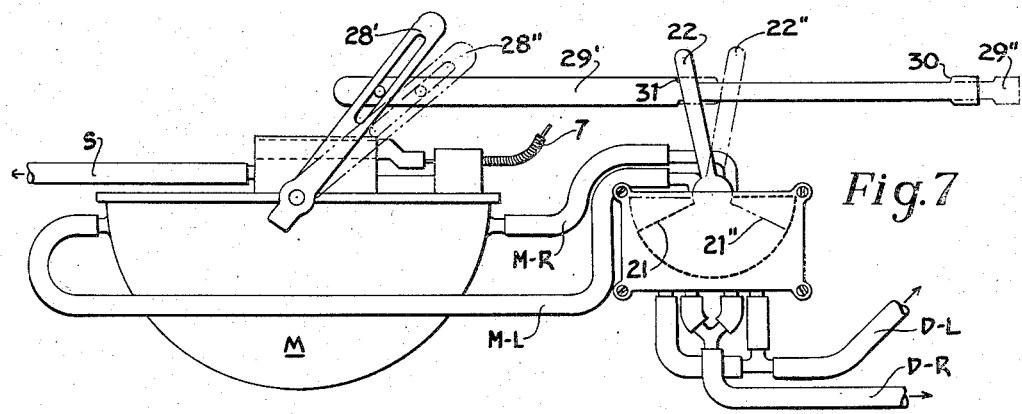

As crank arm 28 rotates to position 28', shown in phantom in Fig. 6, it moves the connecting rod to 29' where shoulder 31 is just abutting arm 22 of the reversing valve which is in its parking position. Concurrently, blades O, C, and P move to positions O', C' and P' which as disclosed in 6A is short of their maximum outward travel. As the blades continue to move to their outer post positions, O'', C'' and P''' in Fig. 7A, the crank arm moves from position 28' to 28'' causing shoulder 31 to move arm 22 to position 22'', placing the reversing valve in its running position as indicated in Fig. 7. With the valve in the running position the right side of the master motor M is connected to the right side of the dummy motor D so that vanes 8 and 10 of the respective motors will tend to run in parallelism.

Figure 7A:
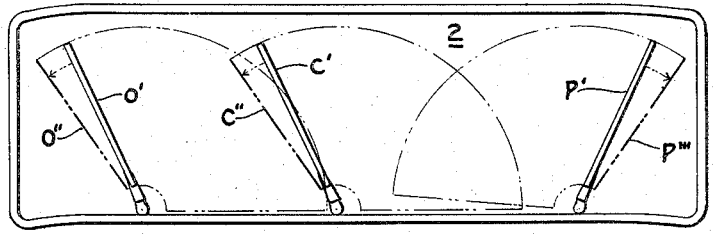
Figure 8:
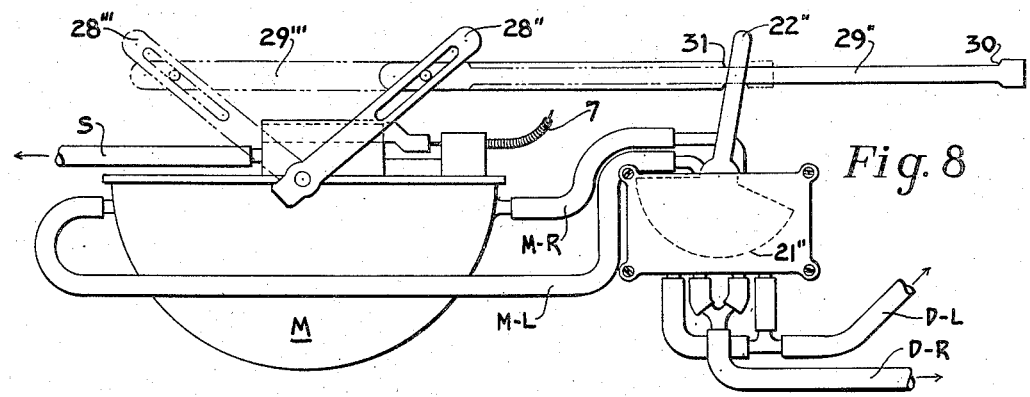
Figure 8A:
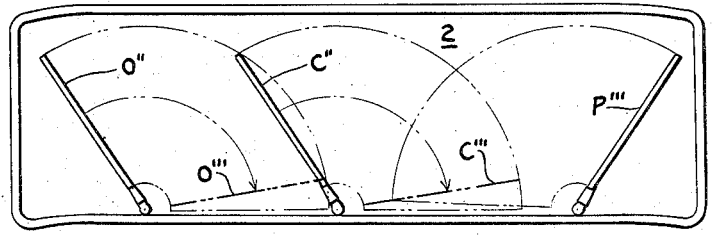

At this point in the cycle of operation the valving, not shown, in motor M reverses the pressure differential across vane 8, causing it to move counterclockwise so as to drive blades O and C clockwise from position O'' and C'' to positions O''' and C''' as indicated in Fig. 8A. As may be seen from this figure, positions O''' and C''' which are the normal clockwise running limits of the blades fall somewhat short of their parking positions contiguous to the molding. As the reversing valve is in its running position, vane 10 similarly tends to drive blade P clockwise. However, as indicated in Fig. 7A, blade P is already in its position of maximum clockwise travel P'''. Therefore, motor D stalls and blade P remains stationary in position P''' as indicated in Fig. 8A. It should be noted that the stalling of motor D has no detrimental effect on the master motor since the only connection between the two is pneumatic. Concurrently, crank 28 moves from position 28'' to 28''', moving the connecting rod to position 29''', shown in phantom, so that shoulder 30 is located proximate to the upstanding arm of the reversing valve.

Figure 9:
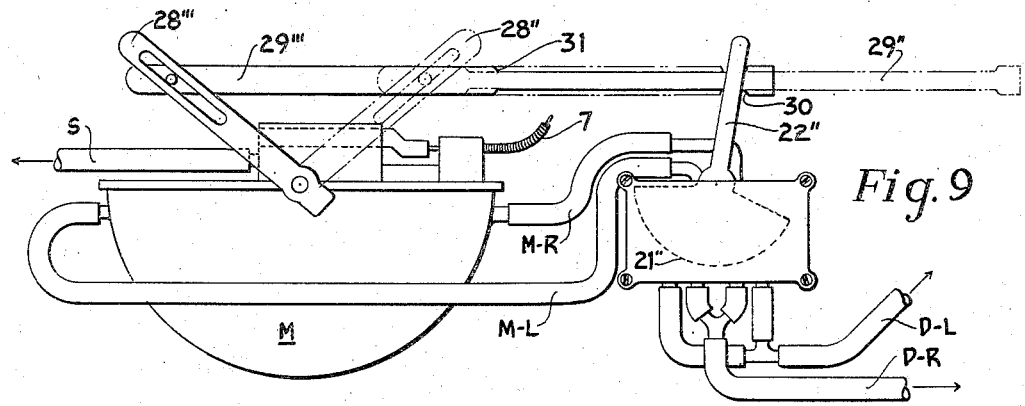
Figure 9A:
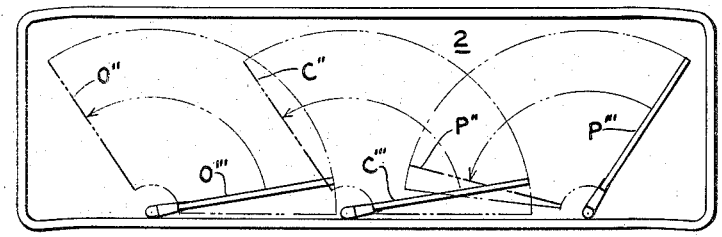

As the blades are now at their normal clockwise limit of travel, the internal valving of motor M again reverses the pressure differential across the vanes so as to drive the blades to their counterclockwise limit position O'', C'' and P'' as indicated in Fig. 9A, while connecting rod 29 is moved to the right to position 29'' by crank arm 28 so that shoulder 31 is just contacting arm 22. All three blades are now moving in phase in the sense that they all rotate clockwise or counterclockwise at the same time, and the system will so continue to run between the extreme positions indicated in Figs. 8 and 9 and Figs. 8A and 9A until it is desired to park the blades and terminate operation.

Figure 10:
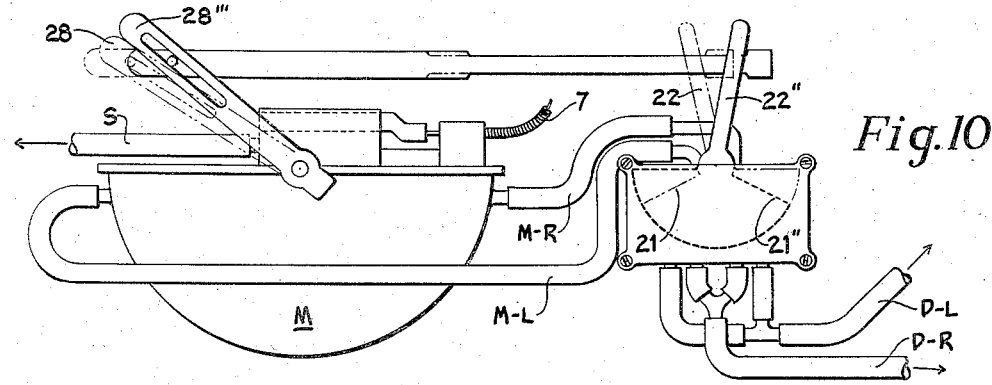
Figure 10A:
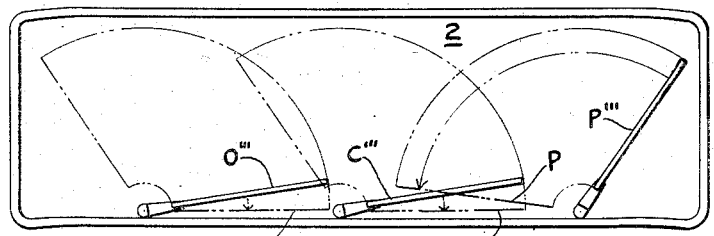

In terminating operation, the internal valving of motor M is moved to its parked position by means of Bowden cable 7 as is described in the above disclosed patent to Buchmann. With the valving in this position, blades O and C will on their clockwise stroke move beyond their normal limits O''' and C''' to their parked positions O and C proximate to the molding. Concurrently, blade P stalls at position P'''. Simultaneous with the over-travel of blades O and C to their parked positions, crank arm 28, via the connecting rod moves the reversing valve to its parking position connecting the right side of the master motor to the left side of the dummy motor so as to cause a reversal of the pressure differential across vane 10. Blade P therefore moves counterclockwise, overlapping blade C and parking in phase opposition thereto as is shown in Fig. 10A and which is the same position illustrated in full lines in Fig. 6A.

It may therefore be seen that by utilizing the windshield cleaning system of the instant invention, it is possible to clean the area immediately in front of both the operator of the vehicle and the passenger, and in addition eliminate the blind spot which formerly existed at the central portion of the windshield during heavy weather. Further, the blades during their normal running operation are synchronized in phase so as to avoid all possibility of binding, while when terminating operation the blade in front of the passenger is automatically thrown into phase opposition to the other two which remain in parallelism, but not until after they have traveled beyond their normal running limits into their arrested position when parked. This disruption of phase permits all of the blades to be parked proximate to the lower molding of the windshield so as not to obstruct vision in clear weather.

Having thus disclosed an exemplary embodiment thereof, what I claim as my invention is:

1. A windshield cleaner for automotive vehicles comprising, a plurality of blades adapted to clear an associated windshield of moisture, and motive means for driving said blades to and fro across the windshield, said motive means including auxiliary means for normally causing said blades to oscillate in phase with each other during the cleaning operation, said auxiliary means including parking means automatically disrupting the in phase relationship of said blades at the termination of the cleaning operation causing parking of one of said blades in phase opposition to another of said blades.

2. A windshield cleaner for automotive vehicles comprising, a plurality of blades adapted to oscillate to and fro across an associated windshield so as to wipe said windshield substantially clear of moisture, and motive means normally driving said blades in a substantially in phase relationship, said motive means including parking means automatically disrupting the in phase relationship of said blades and compelling one of said blades to park in phase opposition to another of said blades.

3. A windshield cleaner for automotive vehicles comprising, a plurality of blades adapted to clear an associated windshield of moisture, and motive means for driving said blades in an in phase relationship to and fro across the windshield between predetermined limits, means for arresting said motive means and parking said blade with one of said blades overrunning said limits when parking, said motive means including means automatically disrupting the in phase relationship when said last named blade overruns its predetermined limit to park another of said blades in phase opposition to said overrunning blade.

4. A windshield cleaner for automotive vehicles comprising, a plurality of blades adapted to clear an associated windshield of moisture, motive means for driving said blades to and fro across the windshield between predetermined limits, said motive means including control means normally causing said blades to move in phase with one another, said motive means causing one of said blades to overrun one of its predetermined limits when parking and having a lost motion connection with said control means effecting a reversal thereof when said one blade overruns its one predetermined limit, said reversal causing a disruption of the in phase relationship of the blades resulting in another of said blades parking in phase opposition to said overrunning blade.

5. A windshield cleaner for automotive vehicles comprising, a plurality of blades arranged to clear an associated windshield of moisture with the area cleared by one of said blades overlapping the area cleared by at least one other blade, and motive means for driving said blades in an in phase relationship to prevent interference between said blades as they move across their overlapping areas, said motive means including means for automatically disrupting the in phase relationship of the blades and compelling one of said blades to park in phase opposition to another of said blades.

6. A windshield cleaner for automotive vehicles comprising, a plurality of blades adapted to clear an associated windshield of moisture, and motive means for driving said blades to and fro across the windshield between predetermined limits, the predetermined limits of one of said blades overlapping the predetermined limits of at least one other blade, said motive means including auxiliary means normally causing said blades to run in an in phase relationship so as to prevent interference between said blades as they approach their overlapping limits, means for arresting said motive means to park said blades with one of said blades overrunning its overlapping limit when parking, said auxiliary means disrupting the phase relationship between said blades when said one blade overruns its overlapping limit and causing another of said blades to park in phase opposition to said overrunning blade.

7. A windshield cleaner for an automotive vehicle comprising, a master motor, a plurality of blades operatively connected to said master motor so as to be oscillated thereby in parallelism across an associated windshield, a dummy motor operatively connected to said master motor, a blade operatively connected to said dummy motor so as to be driven thereby to and fro across the windshield, and additional means interposed between said master motor and said dummy motor for normally causing said dummy motor driven blade to operate in phase with said master motor driven blades, said additional means automatically disrupting the phase relationship of said blades at the termination of the cleaning operation, said phase disruption resulting in said dummy motor driven blade moving into phase opposition to said master motor driven blades.

8. A windshield cleaner for an automotive vehicle comprising, a master motor, at least one blade operatively connected to said master motor so as to be driven thereby to and fro across an associated windshield, a dummy motor operatively connected to said master motor, at least one blade operatively connected to said dummy motor so as to be driven thereby to and fro across the windshield, and additional means including a lost motion connection to the master motor normally causing said dummy motor driven blade to operate in phase with said master motor driven blade, said additional means automatically disrupting the phase relationship of said blades at the termination of the cleaning operation, said phase disruption resulting in said dummy motor driven blade moving into phase opposition to said master motor driven blades.

9. A windshield cleaner for automotive vehicles comprising, a plurality of blades adapted to clear an associated windshield of moisture, and motive means including a plurality of motors for driving said blades to and fro across the windshield, said motive means having additional means including a lost motion connection between the motors normally causing said blades to oscillate in phase with each other during the cleaning operation, said additional means automatically disrupting the phase relationship of said blades at the termination of the cleaning operation, said phase disruption resulting in one of said blades parking in phase opposition to another of said blades.

10. A windshield cleaner for an automotive vehicle comprising, a plurality of blades adapted to oscillate to and fro across an associated windshield so as to wipe said windshield substantially clear of moisture, and a plurality of interconnected oscillatory motors for driving said blades in a substantially in phase relationship, one motor having an automatic valve for operatively applying a pressure differential thereto and the other motor having a pressure controlling valve operable by said one motor, and additional means interposed between said motors and operatively connecting the pressure controlling valve to said one motor for automatically disrupting the phase relationship of the blades, said phase disruption resulting in one of said blades parking in phase opposition to another one of said blades.

11. A windshield cleaner for automotive vehicles comprising, a plurality of blades adapted to clear an associated windshield of moisture, and a plurality of interconnected motors for driving said blades in an in phase relationship to and fro across the windshield between predetermined limits, one of said blades overrunning its limits when parking, and additional means interposed between said motors, said additional means including lost motion means between the motors for disrupting the phase relationship when said last mentioned blade overruns its predetermined limit, said phase disruption resulting in another of said blades parking in phase opposition to the overrunning blade.

12. A windshield cleaner for automotive vehicles comprising, a plurality of blades adapted to clear an associated windshield of moisture, motive means for driving said blades to and fro across the windshield between predetermined limits, said motive means having additional motive means including a lost motion connection to said first motive means for normally causing said blades to move in phase with one another, one of said blades overrunning its limit when parking, said lost motion connection moving said additional means when said last mentioned blade overruns its limit, said movement disrupting the phase relationship so as to compel another of said blades to park in phase opposition to said overrunning blade.

13. A windshield cleaner for automotive vehicles comprising, a plurality of blades adapted to clear an associated windshield of moisture, the area cleared by one of said blades overlapping the area cleared by at least one other blade, a plurality of motors for driving said blades in an in phase relationship so as to prevent interference between said blades as they move across the overlapping areas, and stroke controlling means including a lost motion connection between the two motors for automatically disrupting the phase relationship of the blades, said phase disruption resulting in one of said blades parking in phase opposition to another of said blades.

14. A windshield cleaner for automotive vehicles comprising, a master motor, a wiper blade operatively connected to said master motor, a dummy motor operatively associated with said master motor, a blade operatively connected to said dummy motor so as to be driven thereby to and fro across the windshield, and additional means interposed between said master motor and said dummy motor and causing said dummy motor driven blade to operate in phase with said master motor driven blade, said additional means automatically disrupting the phase relationship of said blade at the termination of the cleaning operation so as to cause said dummy motor driven blade to move into phase opposition to said master motor driven blade.

15. A windshield wiping system for use on the curved windshield of a motor vehicle comprising, at least three wiper blades each carried on its own oscillating arm, a drive shaft for each of said arms, two of said shafts being located one substantially in front of the driver's side of the vehicle and the other substantially in front of the passenger's side thereof with the third shaft being mounted therebetween generally centrally of the vehicle, driving mechanism for all of said oscillating shafts so interrelated that all three of said arms and blades normally will be oscillating substantially synchronously and in phase with each other, control means for starting and stopping the wiping system, and means for effecting out-of-phase movement of one of said arms and blades relative to the others thereof incidental to operation of said control means for stopping the system.

16. In a windshield wiping system for use on the windshield of a motor vehicle, at least three wiping blades separately carried by three oscillating arms each mounted on its own oscillating rockshaft, power mechanism normally driving said shafts to oscillate said three blades in phase with the path of movement of each blade partially overlapping the path of movement of at least one of the other blades, and control means for said mechanism including means for reversing the in-phase movement of one of said blades relative to the others thereof incidental to stopping the operation of the wiping system.

17. A windshield wiping system for use on a motor vehicle comprising, at least three windshield wiping blades pivotally supported on the same number of oscillating rockshafts for oscillation through overlapping paths, driving mechanism for all of said blades driving two of said blades in substantially synchronized movements in phase with each other at all times and driving the rest of said blades substantially in phase with said two blades all of the time that the system is in running condition, said mechanism including means which reverse the phase of said remaining blades relative to the first mentioned two blades as a final step in parking of the system.

References Cited in the file of this patent

UNITED STATES PATENTS

| | | |
|---|---|---|
| 2,045,140 | Horton | June 23, 1936 |
| 2,263,053 | Schuler | Nov. 18, 1941 |
| 2,298,734 | Bochmann | Oct. 13, 1942 |
| 2,446,611 | Rose | Aug. 10, 1948 |
| 2,654,907 | Allen | Oct. 13, 1953 |
| 2,691,186 | Oishei | Oct. 12, 1954 |